US012353856B2

(12) United States Patent
Dahl et al.

(10) Patent No.: US 12,353,856 B2
(45) Date of Patent: Jul. 8, 2025

(54) APPLICATION DEPENDENCY VISUALIZATION

(71) Applicant: Bank of America Corporation, Charlotte, NC (US)

(72) Inventors: Erik Dahl, Newark, DE (US); Pratap Dande, Saint Johns, FL (US); Rahul Yaksh, Austin, TX (US); Vishwanath Prasad Karra, McKinney, TX (US); Steven Allan Reich, Manalapan, NJ (US); Tileshia Brenda Alford, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 188 days.

(21) Appl. No.: 18/063,741

(22) Filed: Dec. 9, 2022

(65) Prior Publication Data
US 2024/0192930 A1    Jun. 13, 2024

(51) Int. Cl.
*G06F 9/44*        (2018.01)
*G06F 8/36*        (2018.01)

(52) U.S. Cl.
CPC ..................................... *G06F 8/36* (2013.01)

(58) Field of Classification Search
None
See application file for complete search history.

(56) References Cited

U.S. PATENT DOCUMENTS

| | | | |
|---|---|---|---|
| 9,535,726 B2 | 1/2017 | Lagerblad et al. | |
| 10,083,030 B1* | 9/2018 | Fant, IV | G06F 8/61 |
| 10,719,188 B2 | 7/2020 | Sanches et al. | |
| 11,044,139 B1* | 6/2021 | Farber | H04L 41/0266 |
| 11,144,862 B1* | 10/2021 | Jackson | H04L 65/65 |
| 11,194,688 B1* | 12/2021 | Featonby | G06F 11/004 |
| 11,755,559 B1* | 9/2023 | Tankersley | G06F 16/2358 |
| | | | 707/694 |
| 2017/0093645 A1* | 3/2017 | Zhong | H04L 41/12 |
| 2020/0057625 A1* | 2/2020 | Livne | G06F 8/65 |
| 2021/0326239 A1* | 10/2021 | Vaughan | G06F 8/77 |
| 2022/0019495 A1* | 1/2022 | Lavi | G06N 20/20 |

* cited by examiner

*Primary Examiner* — Insun Kang
(74) *Attorney, Agent, or Firm* — Banner & Witcoff, Ltd.

(57) ABSTRACT

An application mapping engine may determine dependencies in existing executable application by monitoring and analyzing process flow and data flow of the application during runtime execution. The application mapping engine may generate dependency visualization maps that illustrate dependency interaction information.

17 Claims, 10 Drawing Sheets

APPLICATION DEPENDENCY VISUALIZATION

FIELD

Aspects described herein generally relate to computer systems and networks. More specifically, aspects of this disclosure relate to mapping of application dependencies and visually displaying those dependencies.

BACKGROUND

Organizations may utilize hundreds or thousands of applications to conduct daily business transactions. These applications have many dependencies between each other that are extremely difficult to visualize. There is no common format, style, or system of record for application dependency diagrams for business services. As a result, diagrams are created in various formats, stored in multiple locations, are rarely updated, and almost always have to be redrawn from scratch in response to regulatory or executive requests.

The redrawing of dependency maps is time consuming and wasteful of system resources. Additionally, the current state presents risks of sharing or communicating out of date information, and requires error-prone interpretation of different diagram styles by different users or teams. There is a need to develop a system to generate and update application interface maps that removes wasteful resources and provides a common mapping style across an organization to enable rapid exchange and interpretation of information.

SUMMARY

Aspects of the disclosure provide solutions that address and overcome technical problems associated with generating visual representations of interactions and/or dependencies between applications. The architecture may comprise application components (e.g., logic, functions, etc.), infrastructure components (e.g., computing and/or network services), and/or interconnections. As an application evolves over time, the dependencies between applications change and such changes need to be captured and documented.

Various aspects of this disclosure relate to devices, systems, and methods for mapping of application dependencies. An application mapping engine may determine dependencies in existing executable application by monitoring and analyzing process flow and data flow of the application during runtime execution. The application mapping engine may generate a dependency visualization map that leverages dependency interaction information along with existing sources of dependency information. The generated dependency visualization maps may be modified, annotated, and/or saved for further study. The system may include performing machine learning based on the generated visualization maps and the monitored process and data flow through the applications.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrations, reference is made to the accompanying drawings, which form a part hereof, and in which is shown, by way of illustration, various examples in which aspects of the disclosure may be practiced. It is to be understood that other examples may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for mapping of application dependencies. An application mapping engine may determine dependencies in existing executable application by monitoring and analyzing process flow and data flow of the application during runtime execution. The application mapping engine may generate a dependency visualization map that leverages dependency interaction information along with existing sources of dependency information (service enablers, server dependencies, information flows, product scans, application records etc.). The generated dependency visualization maps may be modified, annotated, and/or saved for further study. The system may include performing machine learning based on the generated visualization maps and the monitored process and data flow through the applications.

Figure 1:
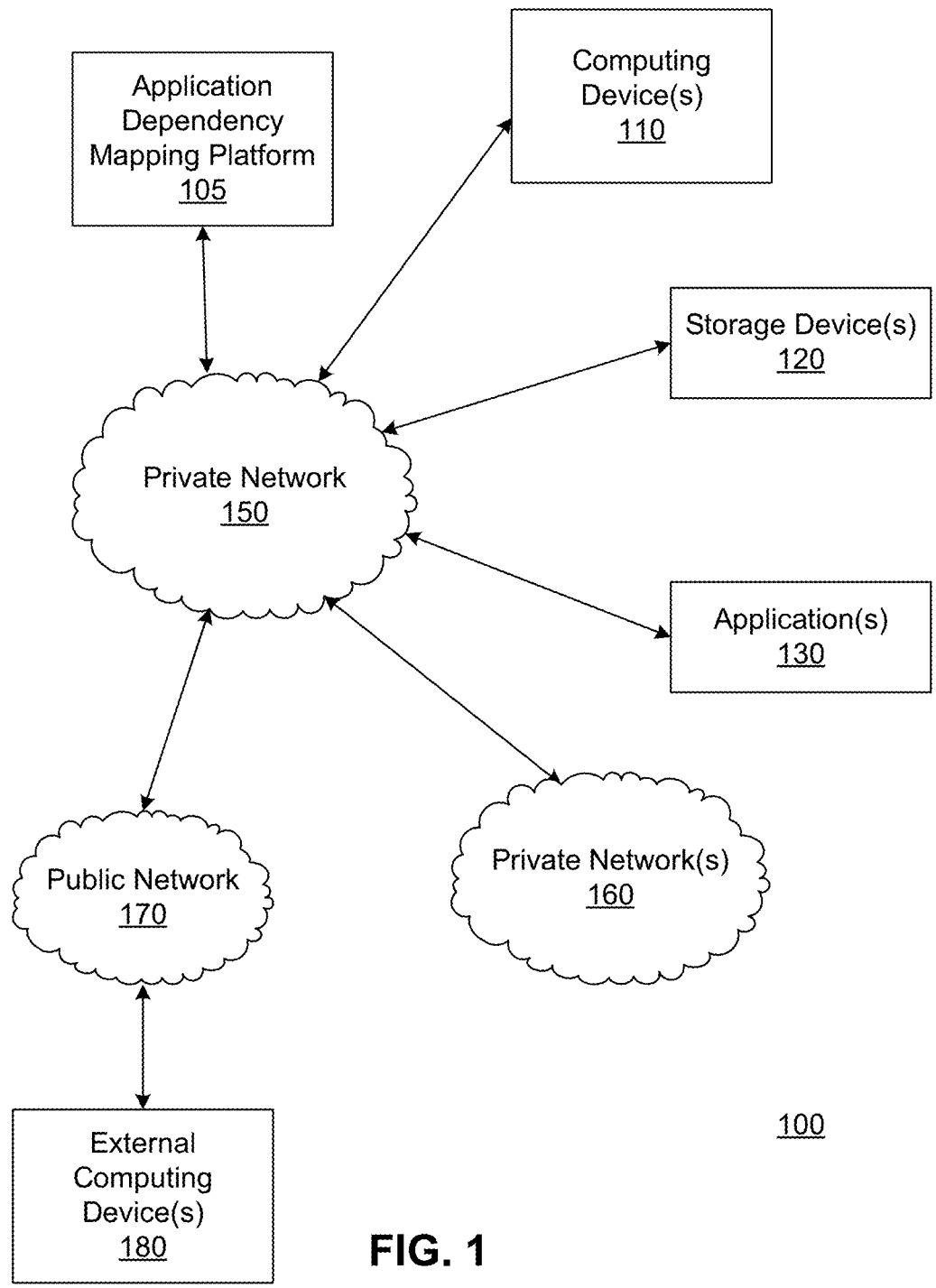
FIGS. 1 and 2 depict an illustrative computing environment for application dependency mapping of executable applications, in accordance with one or more example arrangements.
Figure 2:
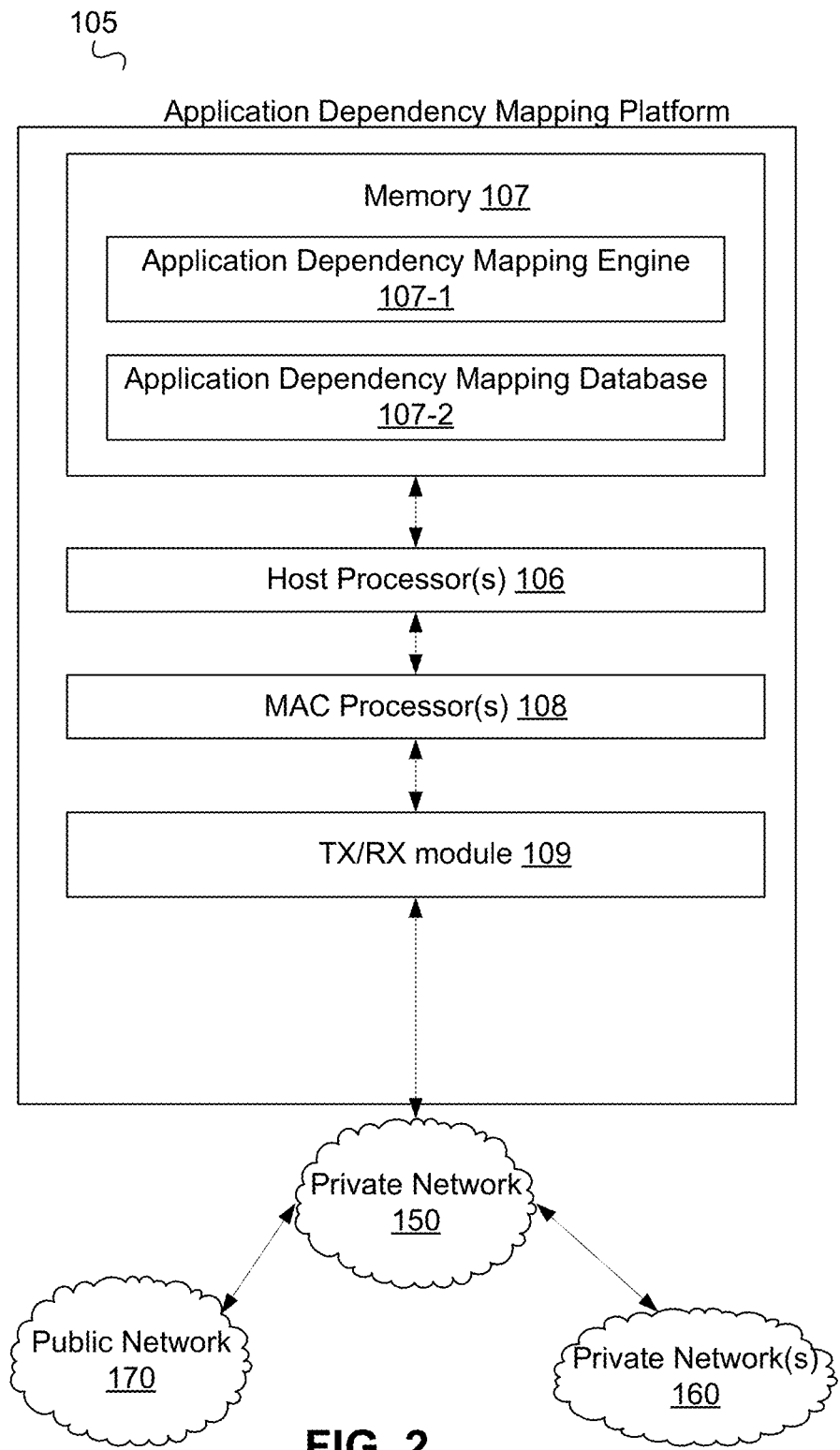

FIGS. 1 and 2 depict an illustrative computing environment for application dependency mapping of executable applications, in accordance with one or more example arrangements. Referring to FIG. 1, a computing environment 100 may comprise one or more devices (e.g., computer systems, communication devices, servers). The computing environment 100 may comprise, for example, an application dependency mapping platform 105, computing device(s) 110, and storage device(s) 120 linked over a private network 150. The storage device(s) 120 may comprise a database, for example, a relational database (e.g., Relational Database Management System (RDBMS), Structured Query Language (SQL), etc.). Application(s) 130 may operate on one or more computing devices or servers associated with the private network 150. The private network 150 may comprise an enterprise private network, for example.

The computing environment 100 may comprise one or more networks (e.g., public networks and/or private networks), which may interconnect with the application dependency mapping platform 105, the computing device(s) 110, the storage device(s) 120, and/or one or more other devices and servers. One or more applications 130 may operate on one or more devices in the computing environment. The networks may use wired and/or wireless communication protocols. The private network 150 may be associated with, for example, an enterprise organization. The private network 150 may interconnect the application dependency mapping platform 105, the computing device(s) 110, the storage device(s) 120, and/or one or more other devices/servers which may be associated with the enterprise organization. The private network 150 may be linked to other private network(s) 160 and/or a public network 170. The public network 170 may comprise the Internet and/or a cloud network. The private network 150 and the private network(s) 160 may correspond to, for example, a local area network (LAN), a wide area network (WAN), a peer-to-peer network, or the like.

A user in a context of the computing environment 100 may be, for example, an associated user (e.g., an employee, an affiliate, or the like) of the enterprise organization. An external user may utilize services being provided by the enterprise organization, and access one or more resources located within the private network 150 (e.g., via the public network 170). Users may operate one or more devices in the computing environment 100 to send messages to and/or receive messages from one or more other devices connected to the computing environment 100. An enterprise organization may correspond to any government or private institution, an educational institution, a financial institution, health services provider, retailer, or the like.

As illustrated in greater detail below, the application dependency mapping platform 105 may comprise one or more computing devices configured to perform one or more of the functions described herein. The application dependency mapping platform 105 may comprise, for example, one or more computers (e.g., laptop computers, desktop computers, servers, server blades, or the like).

The computing device(s) 110 may comprise one or more of enterprise application host platforms, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may transmit and receive data from the application dependency mapping platform 105, and/or to other computer systems in the computing environment 100.

The enterprise user computing device may comprise a personal computing device (e.g., desktop computer, laptop computer) or mobile computing device (e.g., smartphone, tablet). The enterprise user computing device may be linked to and/or operated by a specific enterprise user (e.g., an employee or other affiliate of an enterprise organization).

The administrator computing device may comprise a personal computing device (e.g., desktop computer, laptop computer) or mobile computing device (e.g., smartphone, tablet). The administrator computing device may be linked to and/or operated by an administrative user (e.g., a network administrator of an enterprise organization). The administrator computing device may receive data from the application dependency mapping platform 105, manipulate and/or otherwise process such data, and/or return processed data and/or other data to the application dependency mapping platform 105 and/or to other computer systems in the computing environment 100. The administrator computing device may be configured to control operation of the application dependency mapping platform 105.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the application dependency mapping platform 105, store the data, and/or transmit the data to the architecture mapping platform 105 and/or to other computing systems in the computing environment 100.

The architecture of the private network(s) 160 may be similar to an architecture of the private network 150. The private network(s) 160 may correspond to, for example, another enterprise organization that communicates data with the private network 150. The private network 150 may also be linked to the public network 170. The public network 170 may comprise the external computing device(s) 180. The external computer device(s) 180 may include at least one computing device (e.g., desktop computer, laptop computer) or mobile computing device (e.g., smartphone, tablet). The external computer device(s) 180 may be linked to and/or operated by a user (e.g., a client, an affiliate, or an employee) of an enterprise organization associated with the private network 150. The user may interact with one or more enterprise resources while using the external computing device(s) 180 located outside of an enterprise firewall.

The application dependency mapping platform 105, the computing device(s) 110, the external computing device(s) 180, and/or one or more other systems/devices in the computing environment 100 may comprise any type of computing device capable of receiving input via a user interface, and may communicate the received input to one or more other computing devices. The application dependency mapping platform 105, the computing device(s) 110, the external computing device(s) 180, and/or the other systems/devices in the computing environment 100 may, in some instances, comprise server computers, desktop computers, laptop computers, tablet computers, smart phones, wearable devices, or the like that in turn comprise one or more processors, memories, communication interfaces, storage devices, and/or other components. Any and/or all of the application dependency mapping platform 105, the computing device(s) 110, the storage device(s) 120, and/or other systems/devices in the computing environment 100 may be, in some instances, special-purpose computing devices configured to perform specific functions.

Referring to FIG. 2, the application dependency mapping platform 105 may comprise one or more of host processor(s) 106, memory 107, medium access control (MAC) processor(s) 108, transmit/receive (TX/RX) module(s) 109, or the like. One or more data buses may interconnect host processor(s) 106, memory 107, MAC processor(s) 108, and/or TX/RX module(s) 109. The application dependency mapping platform 105 may be implemented using one or more integrated circuits (ICs), software, or a combination thereof, configured to operate as discussed below. The host processor(s) 106 and the MAC processor(s) 108 may be implemented, at least partially, on a single IC or multiple ICs. Memory 107 may be any memory such as a random-access memory (RAM), a read-only memory (ROM), a flash memory, or any other electronically readable memory, or the like.

One or more processors (e.g., the host processor(s) 106, the MAC processor(s) 108, and/or the like) of the application dependency mapping platform 105 may be configured to execute machine readable instructions stored in memory 107. Memory 107 may comprise (i) one or more program modules/engines having instructions that when executed by the one or more processors cause the application dependency mapping platform 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the application dependency mapping platform 105 and/or by different computing devices that may form and/or otherwise make up the application dependency mapping platform 105. For example, memory 107 may have, store, and/or comprise an application dependency mapping engine 107-1, and an application dependency mapping database 107-2. The application dependency mapping engine 107-1 may comprise instructions that direct and/or cause the application dependency mapping platform 105 to perform one or more operations, as discussed in greater detail below. The application dependency mapping database 107-2 may comprise a SQL database, an Oracle database, or another relational database, for example. The application dependency mapping database 107-2 may store information to be used for performing architecture mapping of an application. The application dependency mapping database 107-2 may store information corresponding to the computing device(s) 110, the storage device(s) 120, the application(s) 130, the private networks 150 and 160, the public network 170, and/or the external computing device(s) 180 operating within the computing environment 100 for performing the application dependency mapping of the application. The host processor(s) 106 may use the application dependency mapping database 107-2 to store, identify, and/or retrieve the information to be used for performing application dependency mapping. The application dependency mapping database 107-2 may be updated based on performance of the application dependency mapping, as discussed in greater detail below.

While FIG. 2 illustrates the application dependency mapping platform 105 as being separate from other elements connected in the private network 150, in one or more other arrangements, the application dependency mapping platform 105 may be included in one or more of the computing device(s) 110, and/or other device/servers associated with the private network 150. Elements in the application dependency mapping platform 105 (e.g., host processor(s) 106, memory(s) 107, MAC processor(s) 108, and TX/RX module(s) 109, one or more program modules and/or stored in memory(s) 107) may share hardware and/or software elements with and corresponding to, for example, one or more of the computing device(s) 110, and/or other device/servers associated with the private network 150.

Figure 3:
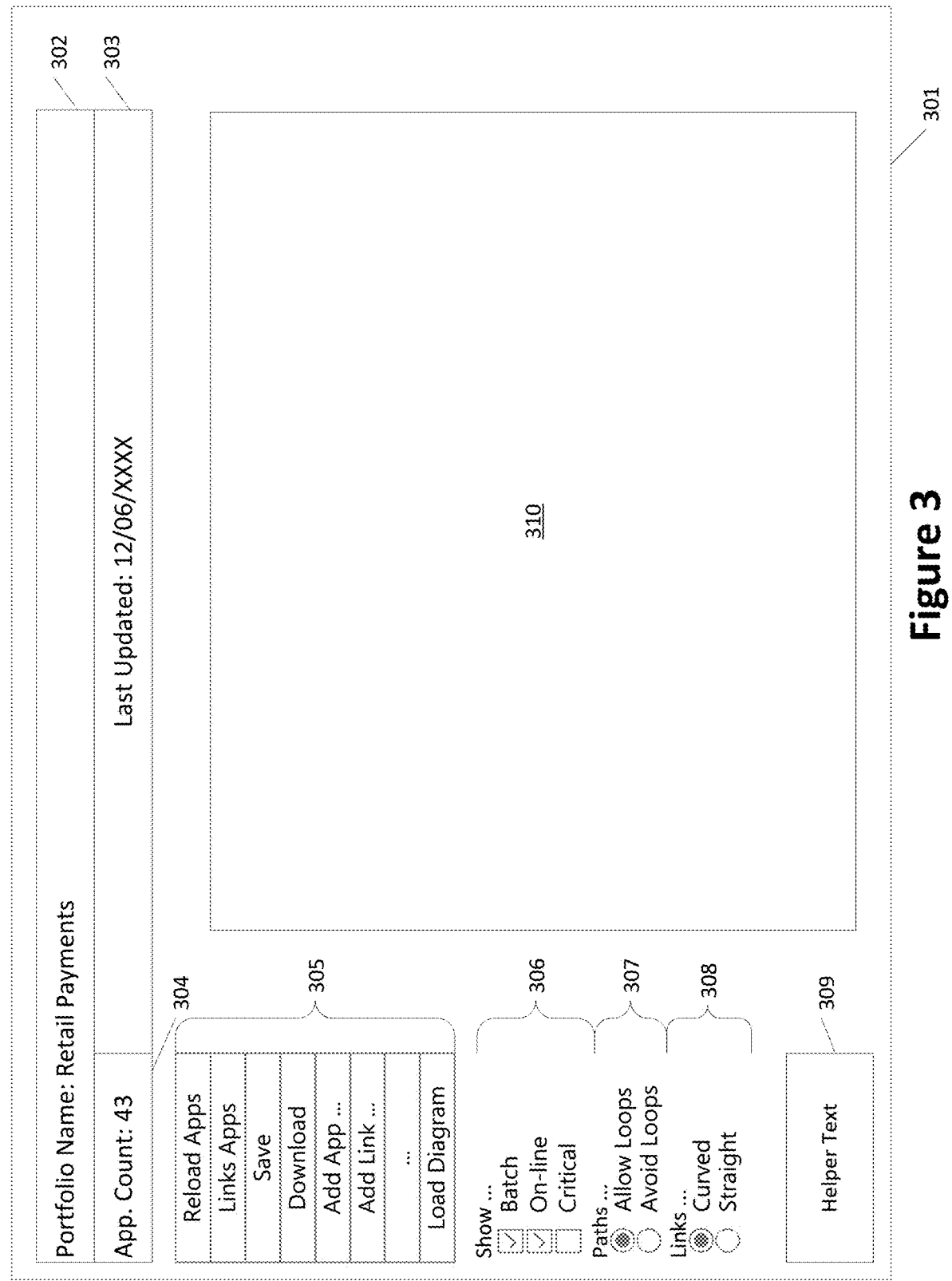
FIG. 3 illustrates an exemplary user interface feature selection background that may be used in accordance with various aspects of the disclosure.

FIG. 3 depicts an exemplary user interface feature selection background 301 that may be used in accordance with various aspects of the disclosure. In an aspect of the disclosure, the exemplary user interface feature selection background 301 may be part of a webpage frame. In an embodiment, user interface controls may be displayed on the left side of user interface feature selection background 301.

In FIG. 3, a retail payments service 302 may be selected for dependency mapping by application dependency mapping platform 105. Application dependency mapping platform 105 may extract data from enterprise database systems and determine application data and information flow data related to retail payments service 302 applications. In an embodiment, the determined application data and information flow data may be analyzed and processed into a JSON data structure. A graphical library may be loaded and executed by application dependency mapping platform 105 for use in rendering a webpage displaying the retail payments service applications and their related dependency mapping.

In an embodiment, application dependency mapping platform 105 may generate an application dependency diagram showing interconnections between applications used in the retail payments service 302. The application dependency mapping diagrams may be displayed in area 310 of user interface feature selection background 301. The user interface feature selection background 301 of FIG. 3 may indicate the last update for the displayed application dependency mapping diagram at 303. Additionally, user interface feature selection background 301 may indicate the number of applications 304 that may be displayed in the mapping diagram for retail payments.

In some arrangements, user interface feature selection background 301 may include a number of diagram controls 305 and a number of visualization controls 306. In an embodiment, diagram controls may include a reload application feature, a link application feature, a save feature, a download feature, an add application feature, an add a link feature, a load diagram feature, and numerous other diagram control features.

User interface feature selection background 301 may also include visualization controls that allow user selection of different types of applications to be displayed in dependency mapping diagrams. For instance, in some arrangements only batch applications may be displayed. In other arrangements, only on-line applications may be displayed. In yet other arrangements, both batch and on-line applications may be displayed. In some arrangements, critical applications may also be displayed and highlighted in application dependency mapping diagrams.

Additional visualization controls may include displaying application loops. The application loops may display all of the dependencies an application has with other applications (i.e. multiple back and forth arrangements). In an embodiment, these loops may be hidden to make the diagram clearer and readable. When not displayed, loop information may still be available by selecting the application to activate drill down menus having detailed information for each application. In some arrangements, user interface feature selection background 301 may also include display link preferences such as using curved lines or straight lines to illustrate application dependencies. User interface feature selection background 301 may also include a help text box 309 which displays useful information for working with application dependency mapping platform 105.

Figure 4:
FIG. 4 illustrates an exemplary application template that may be used in accordance with various aspects of the disclosure.

FIG. 4 illustrates an exemplary application template that may be used in accordance with various aspects of the disclosure. In an embodiment, application template 403 for an application X illustrates an application whose dependency may be shown in relation to a user 401 or associate/agent 402. In some arrangements, application template 403 for application X may include various elements such as an asset identification number 404, a platform type 405, and a recovery tier 406. The asset identification number 404 may allow an organization to track numerous applications across an enterprise. The asset identification number may be a unique number assigned to each application. Platform type 405 for each application may list a location of where an application is found in a hierarchy within an enterprise or organization. For instance, an application may be a middleware application, a desktop application, a mainframe application and/or a third-party application. The recovery tier status 406 of an application may indicate the criticality of an application. For instance, a Tier 0 application may be an application that must always be continuously available for execution. In an embodiment, it may be a requirement for a Tier 0 application to have all dependencies with other applications determined and displayed by application dependency mapping platform 105. In one exemplary instance, applications may have recovery tier designations that range from Tier 0 level to Tier 5.

Figure 5:
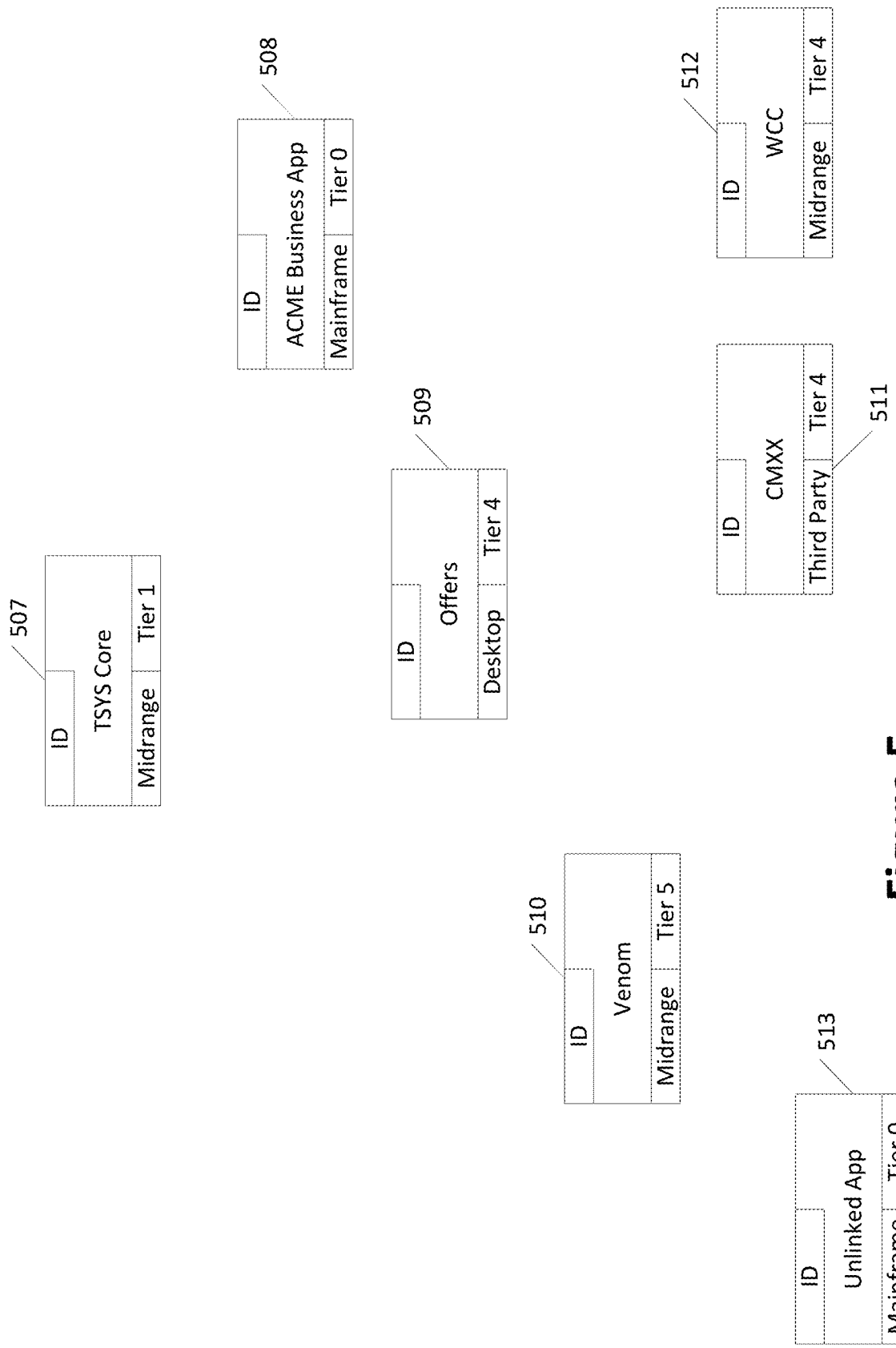
FIG. 5 illustrates additional exemplary application templates that may be used in accordance with various aspects of the disclosure.

FIG. 5 illustrates additional exemplary application templates that may be used in accordance with various aspects of the disclosure. For instance, FIG. 5 illustrates midrange application templates 507, 510, and 512. Application templates 508 and 513 represent mainframe templates. Applications 507 and 512 represent midrange templates. Application 509 illustrates a desktop application. Each of the application templates may provide the applications short description name such as "Venom", "TSYS Core", "ACME Business App", "Offers", "CMXX", and "WCC". In an embodiment, selection of the short description name (or hovering over it) may reveal the full name of the application along with additional application details.

Figure 6:
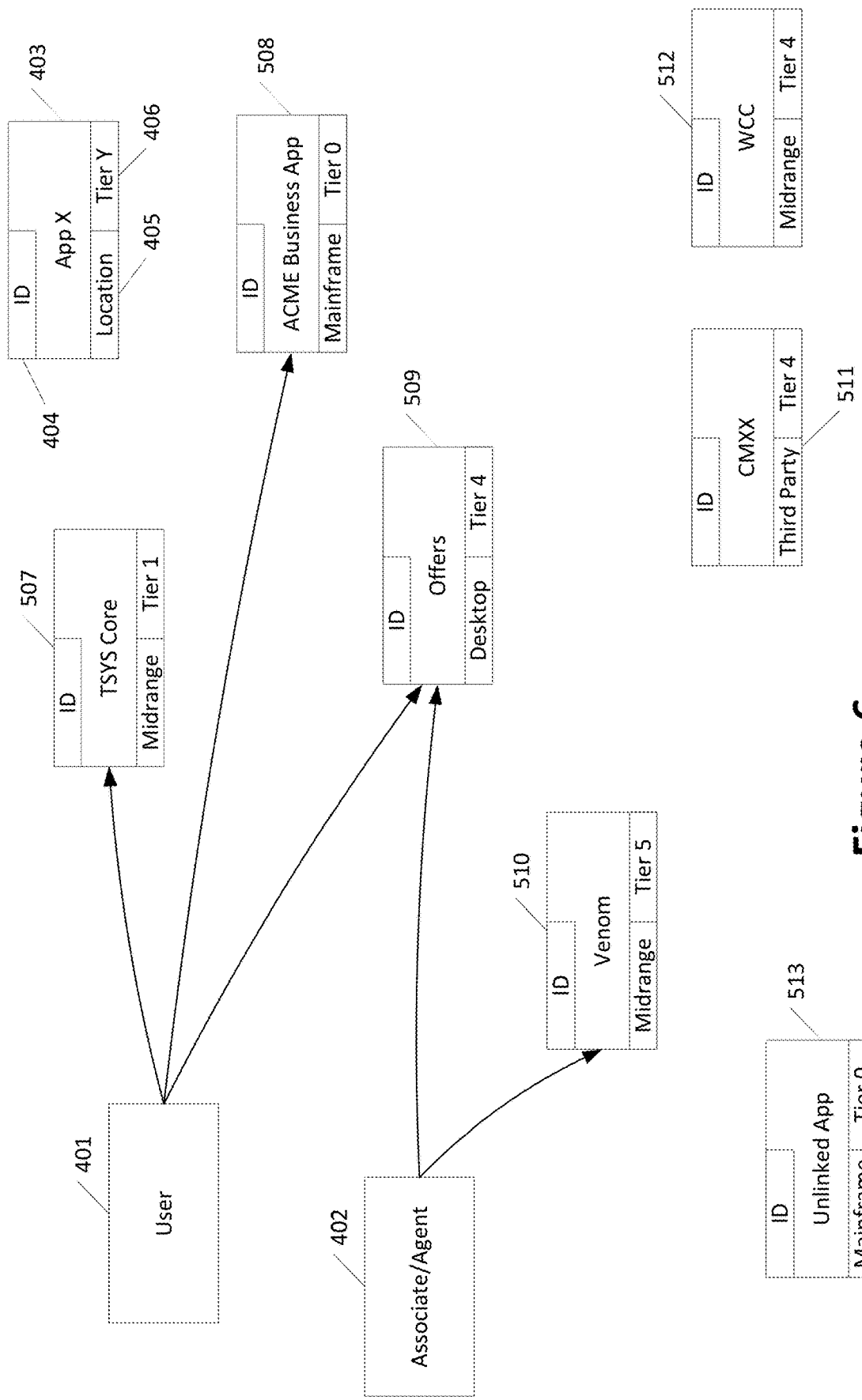
FIG. 6 illustrates exemplary determined application dependencies between users and applications in accordance with various aspects of the disclosure.

FIG. 6 illustrates exemplary determined application dependencies between users and applications in accordance with various aspects of the disclosure. For instance, FIG. 6 illustrates an application dependency between user 601 and "Offers" application template 609. In an aspect of the disclosure, the application templates may be moved or rearranged on the user interface to display alternative layouts based on preferences. For example, dependencies between user 601 and associate/agent 602 may be shown in a left to right progression across area 310 of user interface feature selection background 301. In some arrangements, user 601 and associate/agent 602 may be moved by selecting and dragging their application template boxes to other locations in area 310. Once moved the dependencies may be redrawn on the user interface to account for the relocation.

Figure 7:
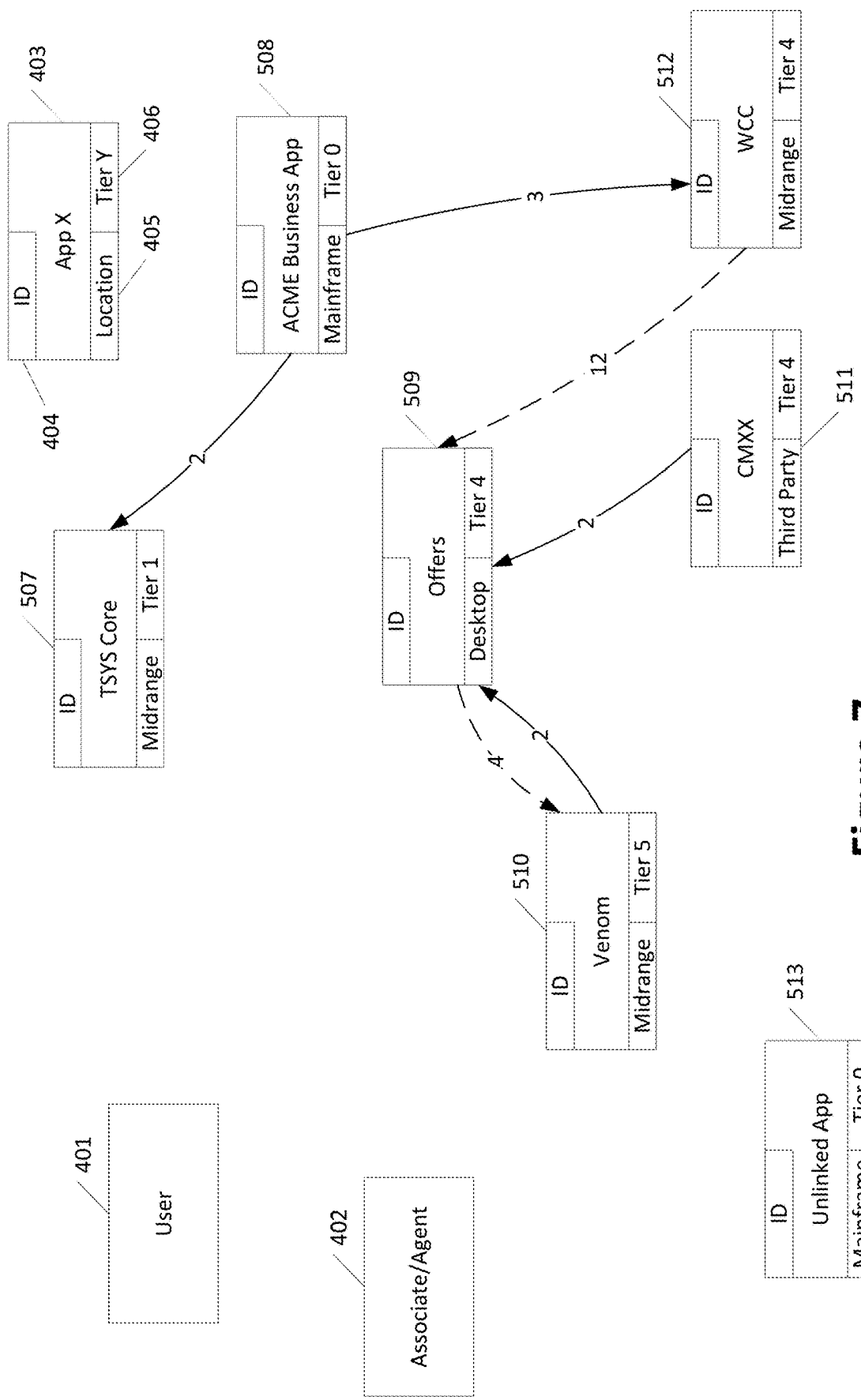
FIG. 7 illustrates exemplary determined application dependencies between applications in accordance with various aspects of the disclosure.

FIG. 7 illustrates exemplary determined application dependencies between applications in accordance with various aspects of the disclosure. For instance, FIG. 7 illustrates an application dependency between application template 708 and application template 707. As shown in FIG. 7 by the line between application template 708 and 707 two dependencies between the applications have been determined. For drawing clarity only one line is displayed on the dependency diagram. Additional information about each of the two dependencies between application template 708 and 707 may be displayed upon selection of the line drawn between application template 708 and 707 (or hovering over it). In some arrangements, dotted lines between application templates may represent batch process dependencies between applications. For instance, FIG. 12 illustrates twelve batch process application dependencies between application templates 712 and 709.

Figure 8:
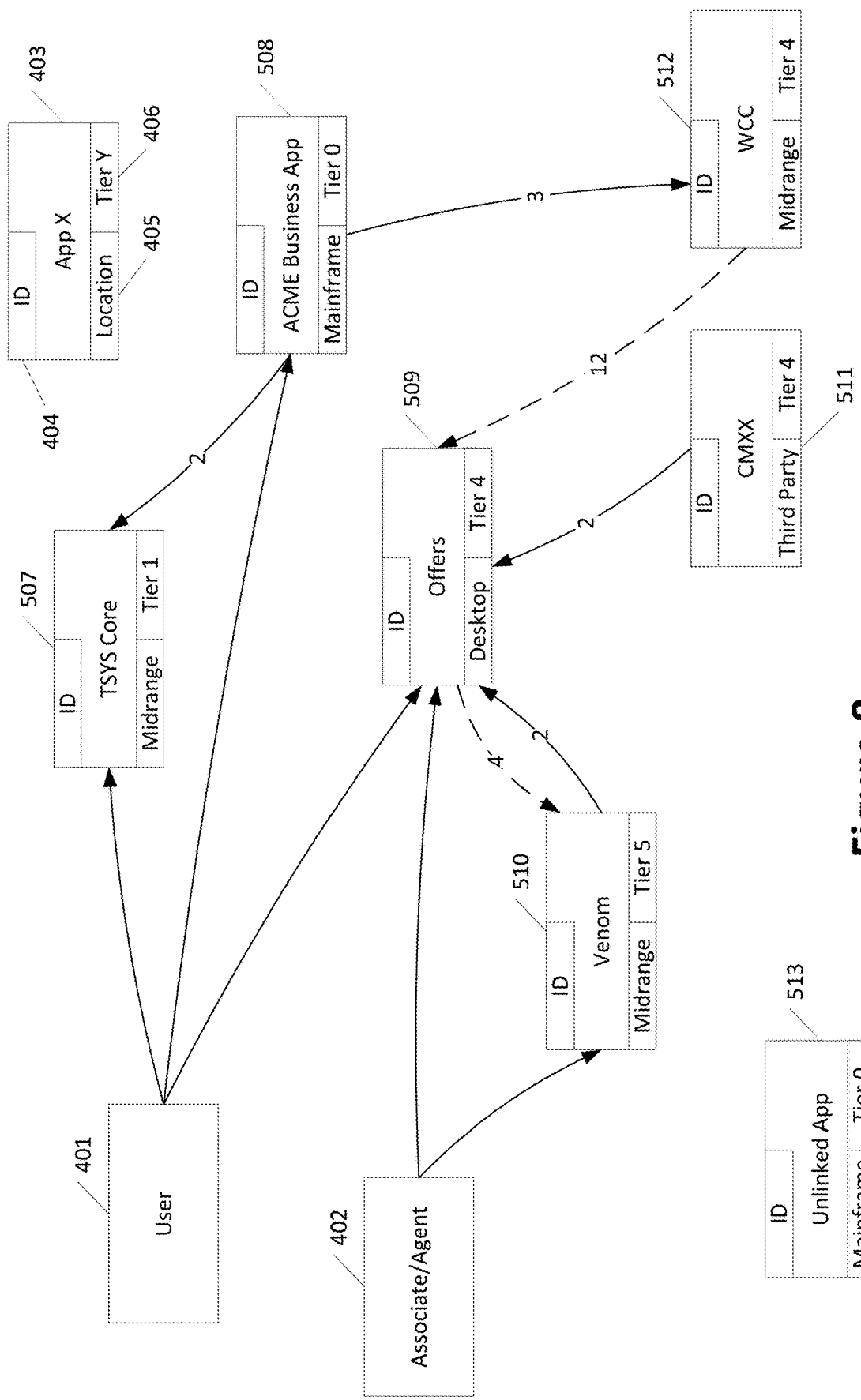
FIG. 8 illustrates a dependency diagram showing all dependencies between applications and users in accordance with various aspects of the disclosure.

FIG. 8 illustrates a dependency diagram showing all dependencies between applications and users in accordance with various aspects of the disclosure. In an embodiment, FIG. 8 may be displayed in area 310 of user interface feature selection background 301 (shown in FIG. 3). As discussed with respect to FIG. 3, user interface controls may be displayed on the left side of user interface feature selection background 301 and used to modify the displayed dependency diagram. FIG. 8 also illustrates that some applications may be standalone applications having no dependencies such as unlinked application template 513. Such applications may still be shown on dependency diagrams as they are still applications included in the selected service. In another embodiment, an application that does not display any dependencies may indicate that a data flow problem exists.

Figure 9:
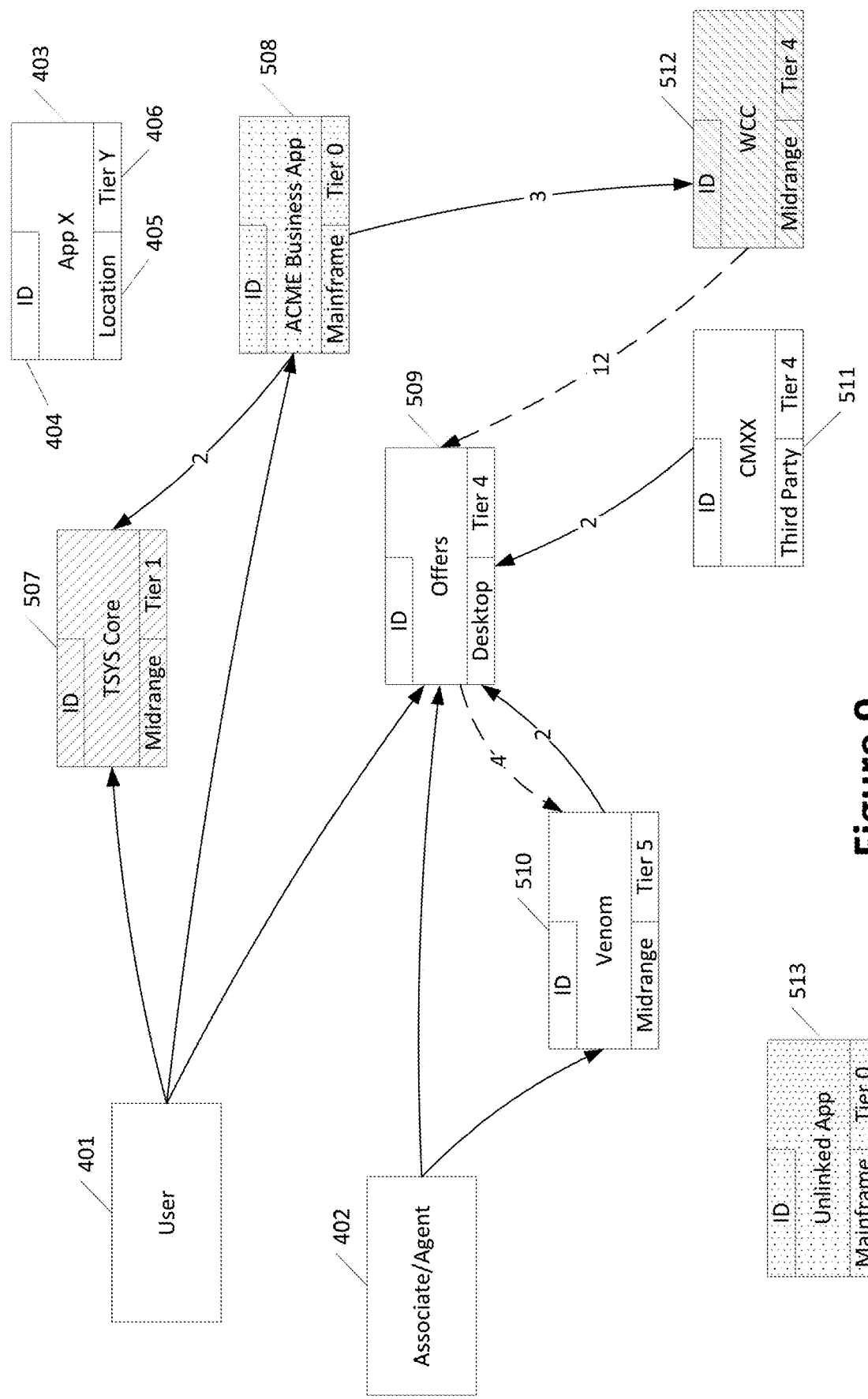
FIG. 9 illustrates using styles and colors to highlight features of application dependency diagrams in accordance with various aspects of the disclosure.

FIG. 9 illustrates using styles and colors to highlight features of similar applications in accordance with various aspects of the disclosure. For instance, FIG. 9 illustrates recovery Tier 0 applications 508 and 513 having a highlighted colored background. This may allow a user to quickly identify all critical applications. Similarly, all midrange applications such as applications 507 and 512 may be highlighted for easy identification. Those skilled in the art will realize that important similar features of application may be highlighted based on enterprise preferences.

In some aspects of the disclosure, detector probes may be configured and initiated to identify application flows between applications. The detector probes may be configured according to a computing environment in which the application executes and/or in which the detector probes are deployed. The detector probes may be configured to execute in a Java runtime environment, a mainframe computing system environment, or any combination of types of computing systems, operating systems, computing networks, or database systems, for example.

In an embodiment, a machine learning algorithm may analyze application flows to determine application dependencies in accordance with an aspect of the disclosure. Machine learning may be performed based on one or more dependencies diagrams with data input into the dependency diagram by one or more detector probes.

In an embodiment, the machine learning algorithm may incorporate user feedback regarding the determined application dependencies and mapped dependency diagrams. Results from the machine learning may be used to update the dependency mapping for improved accuracy in determining application dependencies.

In an embodiment, an application dependency database may store all determined application dependency diagrams. The application dependency database may be updated for any or each completed iteration of dependency application determination.

In another aspect of the disclosure, application dependency diagrams may be compared to each other for different selected services. The compared application dependency diagrams may be analyzed to determine how and where to combine different services. In an embodiment, a compatibility score may be generated and utilized in combing a first application service with a second application service. The analysis may provide insights into utilization of different application and method for improving application speed of execution within services.

Figure 10:
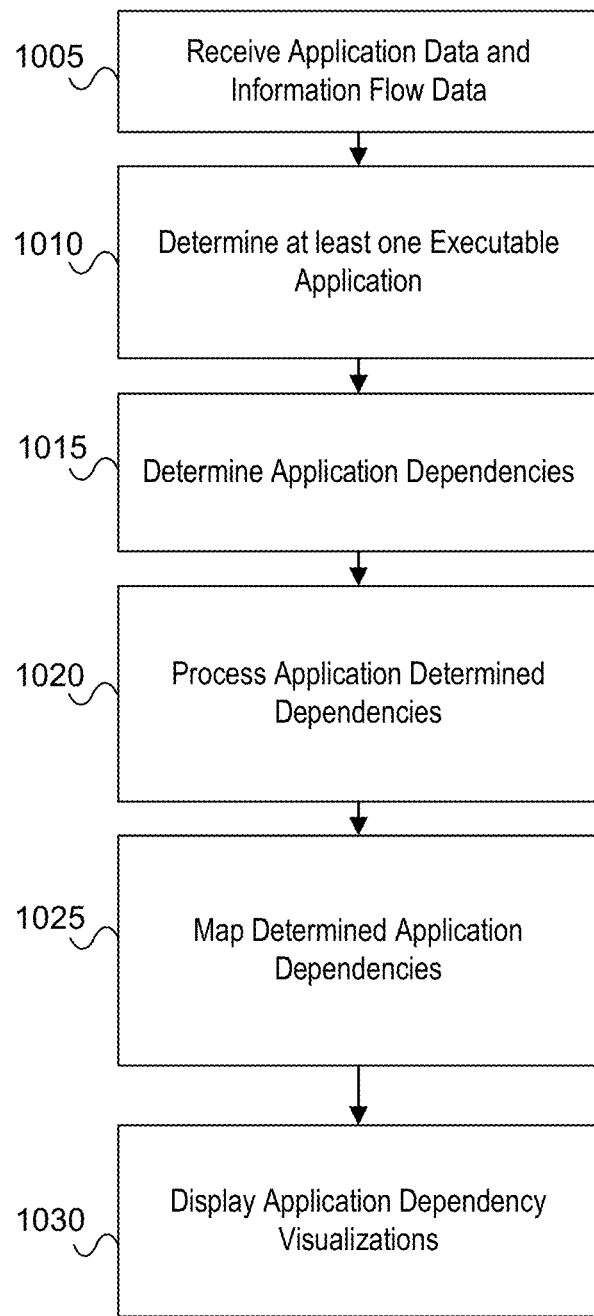
FIG. 10 illustrates a method of determining application dependencies in accordance with various aspects of the disclosure.

FIG. 10 depicts a process flow for generating application dependency diagrams in accordance with one or more example arrangements. In FIG. 10 at step 1005, the application dependency mapping platform 105 may receive application data and information flow data for an application service. In step 1010, application dependency mapping platform 105 may determine at least one executable application included in the application service based on the received data and information flow data. Next, in step 1015, application dependency mapping platform 105 may determine dependencies based on the analyzed application data and information flow data for the determined at least one executable application. In step 1020, application dependency mapping platform 105 may process the determined dependencies into a JSON data structure. Application dependency mapping platform 105 may in step 1025 map the determined application dependencies using a graphical library. In step 1030, application dependency mapping platform 105 may display the application dependency visualizations on a user interface of a display device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various examples. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware example, an entirely software example, an entirely firmware example, or an example combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method for visualizing application dependencies in a computing environment, comprising:
   a. receiving, by an application dependency mapping platform comprising one or more host processors and a memory storing an application dependency mapping engine, application data and information flow data for an application service operating within the computing environment, wherein the application data includes executable application identifiers and the information flow data includes runtime process flow and data flow interactions between a plurality of executable applications within the application service;

b. determining, by the application dependency mapping engine executed by the one or more host processors of the application dependency mapping platform, at least one executable application from the plurality of executable applications included in the application service based on the received application data and information flow data;

c. analyzing, by the application dependency mapping engine executed by the one or more host processors of the application dependency mapping platform, the received application data and information flow data to identify a set of dependencies for the at least one executable application, wherein the set of dependencies includes process flow dependencies and data flow dependencies between the at least one executable application and other executable applications of the plurality of executable applications;

d. configuring, by the application dependency mapping platform, a plurality of detector probes to monitor runtime execution of the at least one executable application within the computing environment, wherein the plurality of detector probes is configured based on a type of the computing environment including at least one of a Java runtime environment or a mainframe computing system environment;

e. executing, by the plurality of detector probes deployed within the computing environment, runtime monitoring of the at least one executable application to collect real-time dependency interaction information, wherein the real-time dependency interaction information includes dynamic process flow and data flow interactions not present in the received application data and information flow data;

f. updating, by the application dependency mapping engine executed by the one or more host processors of the application dependency mapping platform, the set of dependencies for the at least one executable application by incorporating the real-time dependency interaction information collected by the plurality of detector probes;

g. processing, by the application dependency mapping engine executed by the one or more host processors of the application dependency mapping platform, the updated set of dependencies into a JavaScript Object Notation (JSON) data structure, wherein the JSON data structure organizes the process flow dependencies and the data flow dependencies into a format compatible with a graphical library;

h. generating, by the application dependency mapping engine executed by the one or more host processors of the application dependency mapping platform, using the graphical library, a dependency visualization map based on the JSON data structure, wherein the dependency visualization map visually represents the updated set of dependencies as interconnections between the at least one executable application and the other executable applications, and wherein the dependency visualization map includes application templates with unique identifiers, platform types, and recovery tiers for each represented executable application;

i. displaying, by a user interface of a display device communicatively coupled to the application dependency mapping platform, the dependency visualization map within a user interface feature selection background, wherein the user interface feature selection background includes diagram controls for modifying the dependency visualization map and visualization controls for selectively displaying specific types of the plurality of executable applications;

j. receiving, by the user interface of the display device, user feedback regarding the displayed dependency visualization map, wherein the user feedback includes annotations or modifications to the interconnections represented in the dependency visualization map;

k. performing, by a machine learning algorithm executed by the one or more host processors of the application dependency mapping platform, machine learning analysis on the updated set of dependencies and the user feedback to refine dependency determination accuracy, wherein the machine learning analysis identifies patterns in the process flow dependencies and the data flow dependencies;

l. updating, by the application dependency mapping engine executed by the one or more host processors of the application dependency mapping platform, the dependency visualization map based on results of the machine learning analysis to produce an updated dependency visualization map with improved accuracy;

m. storing, by an application dependency mapping database within the memory of the application dependency mapping platform, the updated dependency visualization map and the updated set of dependencies for future retrieval and comparison;

n. comparing, by the application dependency mapping engine executed by the one or more host processors of the application dependency mapping platform, the updated dependency visualization map with a second dependency visualization map of a second application service to identify overlapping dependencies; and o. generating, by the application dependency mapping engine executed by the one or more host processors of the application dependency mapping platform, a compatibility score based on the identified overlapping dependencies, wherein the compatibility score indicates a feasibility of combining the application service with the second application service for improved execution efficiency within the computing environment.

2. The method of claim 1, wherein the application data and the information flow data are extracted from a plurality of enterprise database systems communicatively coupled to the application dependency mapping platform, and wherein the plurality of enterprise database systems includes at least one relational database storing the executable application identifiers and runtime execution logs of the plurality of executable applications.

3. The method of claim 2, wherein analyzing the received application data and the information flow data by the application dependency mapping engine further comprises identifying batch process dependencies between the at least one executable application and the other executable applications, and wherein the dependency visualization map visually represents the batch process dependencies with dotted lines distinct from solid lines representing online process dependencies.

4. The method of claim 3, wherein generating the dependency visualization map further comprises assigning, by the application dependency mapping engine, a highlighted colored background to the application templates of executable applications designated as Tier 0 recovery tier applications to visually distinguish critical applications from non-critical applications in the dependency visualization map.

5. The method of claim 4, wherein displaying the dependency visualization map further comprises providing, by the user interface of the display device, a drill-down menu activated by user selection of an application template in the dependency visualization map, wherein the drill-down menu displays detailed dependency information including a full name of a selected executable application and a count of the interconnections associated with the selected executable application.

6. The method of claim 5, wherein receiving the user feedback further comprises enabling, by the user interface of the display device, dragging of the application templates to rearrange a layout of the dependency visualization map, and wherein the application dependency mapping engine redraws the interconnections based on the rearranged layout to maintain visual clarity of the updated set of dependencies.

7. The method of claim 6, wherein performing the machine learning analysis further comprises training, by the machine learning algorithm, a model to predict potential dependency conflicts based on the identified patterns in the process flow dependencies and the data flow dependencies, and wherein the updated dependency visualization map highlights the potential dependency conflicts with a distinct visual indicator.

8. The method of claim 7, wherein storing the updated dependency visualization map further comprises associating, by the application dependency mapping database, a timestamp with the updated dependency visualization map, and wherein the user interface of the display device displays the timestamp alongside the updated dependency visualization map to indicate a last update time.

9. A method for visualizing application dependencies in a computing environment, comprising:
   a. receiving, by an application dependency mapping platform comprising one or more host processors and a memory storing an application dependency mapping engine, application data and information flow data for an application service operating within the computing environment, wherein the application data includes executable application identifiers and the information flow data includes runtime process flow and data flow interactions between a plurality of executable applications within the application service, wherein the application data and the information flow data are extracted from a plurality of enterprise database systems communicatively coupled to the application dependency mapping platform, and wherein the plurality of enterprise database systems includes at least one relational database storing the executable application identifiers and runtime execution logs of the plurality of executable applications;
   b. determining, by the application dependency mapping engine executed by the one or more host processors of the application dependency mapping platform, at least one executable application from the plurality of executable applications included in the application service based on the received application data and information flow data;
   c. analyzing, by the application dependency mapping engine executed by the one or more host processors of the application dependency mapping platform, the received application data and the information flow data to identify a set of dependencies for the at least one executable application, wherein the set of dependencies includes process flow dependencies and data flow dependencies between the at least one executable application and other executable applications of the plurality of executable applications, and wherein analyzing the received application data and the information flow data further comprises identifying batch process dependencies between the at least one executable application and the other executable applications;
   d. configuring, by the application dependency mapping platform, a plurality of detector probes to monitor runtime execution of the at least one executable application within the computing environment, wherein the plurality of detector probes is configured based on a type of the computing environment including at least one of a Java runtime environment or a mainframe computing system environment;
   e. executing, by the plurality of detector probes deployed within the computing environment, runtime monitoring of the at least one executable application to collect real-time dependency interaction information, wherein the real-time dependency interaction information includes dynamic process flow and data flow interactions not present in the received application data and information flow data;
   f. updating, by the application dependency mapping engine executed by the one or more host processors of the application dependency mapping platform, the set of dependencies for the at least one executable application by incorporating the real-time dependency interaction information collected by the plurality of detector probes;
   g. processing, by the application dependency mapping engine executed by the one or more host processors of the application dependency mapping platform, the updated set of dependencies into a JavaScript Object Notation (JSON) data structure, wherein the JSON data structure organizes the process flow dependencies, the data flow dependencies, and the batch process dependencies into a format compatible with a graphical library;
   h. generating, by the application dependency mapping engine executed by the one or more host processors of the application dependency mapping platform using the graphical library, a dependency visualization map based on the JSON data structure, wherein the dependency visualization map visually represents the updated set of dependencies as interconnections between the at least one executable application and the other executable applications, wherein the dependency visualization map includes application templates with unique identifiers, platform types, and recovery tiers for each represented executable application, wherein generating the dependency visualization map further comprises assigning a highlighted colored background to the application templates of executable applications designated as Tier 0 recovery tier applications to visually distinguish critical applications from non-critical applications, and wherein the dependency visualization map visually represents the batch process dependencies with dotted lines distinct from solid lines representing online process dependencies;
   i. displaying, by a user interface of a display device communicatively coupled to the application dependency mapping platform, the dependency visualization map within a user interface feature selection background, wherein the user interface feature selection background includes diagram controls for modifying the dependency visualization map and visualization controls for selectively displaying specific types of the plurality of executable applications, and wherein displaying the dependency visualization map further comprises providing a drill-down menu activated by user selection of an application template in the dependency visualization map, wherein the drill-down menu displays detailed dependency information including a full name of a selected executable application and a count of the interconnections associated with the selected executable application;

j. receiving, by the user interface of the display device, user feedback regarding the displayed dependency visualization map, wherein the user feedback includes annotations or modifications to the interconnections represented in the dependency visualization map, and wherein receiving the user feedback further comprises enabling dragging of the application templates to rearrange a layout of the dependency visualization map, and wherein the application dependency mapping engine redraws the interconnections based on the rearranged layout to maintain visual clarity of the updated set of dependencies;

k. performing, by a machine learning algorithm executed by the one or more host processors of the application dependency mapping platform, machine learning analysis on the updated set of dependencies and the user feedback to refine dependency determination accuracy, wherein the machine learning analysis identifies patterns in the process flow dependencies, the data flow dependencies, and the batch process dependencies, and wherein performing the machine learning analysis further comprises training a model to predict potential dependency conflicts based on the identified patterns, and wherein the updated dependency visualization map highlights the potential dependency conflicts with a distinct visual indicator;

l. updating, by the application dependency mapping engine executed by the one or more host processors of the application dependency mapping platform, the dependency visualization map based on results of the machine learning analysis to produce an updated dependency visualization map with improved accuracy;

m. storing, by an application dependency mapping database within the memory of the application dependency mapping platform, the updated dependency visualization map and the updated set of dependencies for future retrieval and comparison, wherein storing the updated dependency visualization map further comprises associating a timestamp with the updated dependency visualization map, and wherein the user interface of the display device displays the timestamp alongside the updated dependency visualization map to indicate a last update time;

n. comparing, by the application dependency mapping engine executed by the one or more host processors of the application dependency mapping platform, the updated dependency visualization map with a second dependency visualization map of a second application service to identify overlapping dependencies, wherein comparing the updated dependency visualization map with the second dependency visualization map further comprises analyzing a number of shared executable applications between the application service and the second application service; and o. generating, by the application dependency mapping engine executed by the one or more host processors of the application dependency mapping platform, a compatibility score based on the identified overlapping dependencies, wherein the compatibility score indicates a feasibility of combining the application service with the second application service for improved execution efficiency within the computing environment.

10. A system for visualizing application dependencies in a computing environment, comprising:

a. an application dependency mapping platform comprising one or more host processors and a memory, wherein the application dependency mapping platform receives application data and information flow data for an application service operating within the computing environment, wherein the application data includes executable application identifiers and the information flow data includes runtime process flow and data flow interactions between a plurality of executable applications within the application service, and wherein the application dependency mapping platform extracts the application data and the information flow data from a plurality of enterprise database systems communicatively coupled to the application dependency mapping platform;

b. a plurality of enterprise database systems communicatively coupled to the application dependency mapping platform, wherein the plurality of enterprise database systems includes at least one relational database that stores the executable application identifiers and runtime execution logs of the plurality of executable applications;

c. an application dependency mapping engine stored in the memory and executed by the one or more host processors of the application dependency mapping platform, wherein the application dependency mapping engine determines at least one executable application from the plurality of executable applications included in the application service based on the received application data and information flow data, analyzes the received application data and the information flow data to identify a set of dependencies for the at least one executable application including process flow dependencies, data flow dependencies, and batch process dependencies between the at least one executable application and other executable applications of the plurality of executable applications, processes the set of dependencies into a JavaScript Object Notation (JSON) data structure that organizes the process flow dependencies, the data flow dependencies, and the batch process dependencies into a format compatible with a graphical library, and generates a dependency visualization map based on the JSON data structure using the graphical library;

d. a plurality of detector probes deployed within the computing environment, wherein the plurality of detector probes is configured by the application dependency mapping platform to monitor runtime execution of the at least one executable application based on a type of the computing environment including at least one of a Java runtime environment or a mainframe computing system environment, and executes runtime monitoring to collect real-time dependency interaction information including dynamic process flow and data flow interactions not present in the received application data and information flow data, wherein the application dependency mapping engine updates the set of dependencies by incorporating the real-time dependency interaction information;

e. a graphical library stored in the memory and executed by the application dependency mapping engine, wherein the graphical library generates the dependency visualization map that visually represents the updated set of dependencies as interconnections between the at least one executable application and the other executable applications, includes application templates with unique identifiers, platform types, and recovery tiers for each represented executable application, assigns a highlighted colored background to the application templates of executable applications designated as Tier 0 recovery tier applications to visually distinguish critical applications from non-critical applications, and visually represents the batch process dependencies with dotted lines distinct from solid lines representing online process dependencies;

f. a display device communicatively coupled to the application dependency mapping platform, wherein the display device includes a user interface that displays the dependency visualization map within a user interface feature selection background including diagram controls for modifying the dependency visualization map and visualization controls for selectively displaying specific types of the plurality of executable applications, provides a drill-down menu activated by user selection of an application template in the dependency visualization map displaying detailed dependency information including a full name of a selected executable application and a count of the interconnections associated with the selected executable application, receives user feedback regarding the displayed dependency visualization map including annotations or modifications to the interconnections, enables dragging of the application templates to rearrange a layout of the dependency visualization map, and displays a timestamp alongside the dependency visualization map to indicate a last update time;

g. a machine learning algorithm stored in the memory and executed by the one or more host processors of the application dependency mapping platform, wherein the machine learning algorithm performs machine learning analysis on the updated set of dependencies and the user feedback to refine dependency determination accuracy, identifies patterns in the process flow dependencies, the data flow dependencies, and the batch process dependencies, and trains a model to predict potential dependency conflicts based on the identified patterns, wherein the application dependency mapping engine updates the dependency visualization map based on results of the machine learning analysis to produce an updated dependency visualization map with improved accuracy that highlights the potential dependency conflicts with a distinct visual indicator;

h. an application dependency mapping database stored within the memory of the application dependency mapping platform, wherein the application dependency mapping database stores the updated dependency visualization map and the updated set of dependencies for future retrieval and comparison, and associates the timestamp with the updated dependency visualization map;

i. wherein the application dependency mapping engine further compares the updated dependency visualization map with a second dependency visualization map of a second application service to identify overlapping dependencies, analyzes a number of shared executable applications between the application service and the second application service, generates a compatibility score based on the identified overlapping dependencies indicating a feasibility of combining the application service with the second application service for improved execution efficiency within the computing environment; and j. wherein the user interface of the display device further displays the compatibility score to facilitate service integration decisions, and wherein the application dependency mapping engine redraws the interconnections in the dependency visualization map based on the rearranged layout to maintain visual clarity of the updated set of dependencies.

11. The system of claim 10, wherein the application dependency mapping engine further filters the set of dependencies to exclude application loops representing multiple back-and-forth dependencies between the at least one executable application and the other executable applications, and wherein the user interface of the display device provides an option to selectively display the application loops in the dependency visualization map upon user activation.

12. The system of claim 11, wherein the user interface of the display device further includes a help text box that displays instructional information for interacting with the application dependency mapping platform, and wherein the instructional information includes guidance on using the diagram controls and the visualization controls to modify the dependency visualization map.

13. The system of claim 12, wherein the application dependency mapping engine further assigns a criticality indicator to each of the plurality of executable applications based on the recovery tiers in the application templates, and wherein the dependency visualization map visually represents the criticality indicator using varying line thicknesses for the interconnections, with thicker lines indicating higher criticality dependencies.

14. The system of claim 13, wherein the plurality of detector probes further collects performance metrics during runtime monitoring of the at least one executable application, wherein the performance metrics include execution time and resource utilization associated with the set of dependencies, and wherein the application dependency mapping engine integrates the performance metrics into the dependency visualization map to display performance data alongside the interconnections.

15. The system of claim 14, wherein the machine learning algorithm further analyzes the performance metrics to identify bottlenecks in the set of dependencies, and wherein the updated dependency visualization map highlights the identified bottlenecks with a distinct color overlay on the interconnections associated with the bottlenecks.

16. The system of claim 15, wherein the application dependency mapping database further stores historical versions of the dependency visualization map with associated timestamps, and wherein the application dependency mapping engine retrieves a selected historical version of the dependency visualization map from the application dependency mapping database for comparison with the updated dependency visualization map to identify changes in the set of dependencies over time.

17. The system of claim 16, wherein the application dependency mapping engine further generates a dependency change report based on the comparison of the selected historical version of the dependency visualization map with the updated dependency visualization map, wherein the dependency change report lists added, removed, or modified dependencies, and wherein the user interface of the display device displays the dependency change report alongside the updated dependency visualization map.

* * * * *